US012038286B2

(12) United States Patent
Vukich et al.

(10) Patent No.: US 12,038,286 B2
(45) Date of Patent: Jul. 16, 2024

(54) UTILIZING MACHINE LEARNING AND A NETWORK OF TRUST FOR CROWD AND TRAFFIC CONTROL AND FOR MAPPING A GEOGRAPHICAL AREA

(71) Applicant: Capital One Services, LLC, McLean, VA (US)

(72) Inventors: Adam Vukich, Alexandria, VA (US); George Bergeron, Falls Church, VA (US); James Zarakas, Centreville, VA (US)

(73) Assignee: Capital One Services, LLC, McLean, VA (US)

( * ) Notice: Subject to any disclaimer, the term of this patent is extended or adjusted under 35 U.S.C. 154(b) by 530 days.

(21) Appl. No.: 16/947,474

(22) Filed: Aug. 3, 2020

(65) Prior Publication Data
US 2022/0034664 A1 Feb. 3, 2022

(51) Int. Cl.
*G01C 21/20* (2006.01)
*G01C 21/00* (2006.01)

(52) U.S. Cl.
CPC ......... *G01C 21/206* (2013.01); *G01C 21/383* (2020.08); *G01C 21/3841* (2020.08); *G01C 21/3896* (2020.08)

(58) Field of Classification Search
CPC .. G01C 21/00; G08G 1/00; G06Q 10/04–047; G06Q 50/30
USPC .................................................. 701/400–541
See application file for complete search history.

(56) References Cited

U.S. PATENT DOCUMENTS

| 8,774,839 B2 | 7/2014 | Busch |
| 9,639,858 B2 | 5/2017 | Busch |
| 2009/0270065 A1* | 10/2009 | Hamada ................ G08B 7/066 455/404.1 |

(Continued)

FOREIGN PATENT DOCUMENTS

WO WO-2020187668 A1 * 9/2020 ............... B63C 9/28

OTHER PUBLICATIONS

F. S. Park, C. Gangakhedkar and P. Traynor, "Leveraging Cellular Infrastructure to Improve Fraud Prevention," 2009 Annual Computer Security Applications Conference, 2009, pp. 350-359, doi: 10.1109/ACSAC.2009.40. (Year: 2009).*

(Continued)

*Primary Examiner* — Rami Khatib
*Assistant Examiner* — Paul Allen
(74) *Attorney, Agent, or Firm* — Harrity & Harrity, LLP

(57) ABSTRACT

A device may receive application data associated with transaction applications of client devices and transaction card data associated with transaction cards. The device may receive geographical data identifying a geographical area associated with users of the client devices and the transaction cards. The device may determine, based on the application data, the transaction card data, and the geographical data, location data identifying geographical locations of the users in the geographical area. The device may determine, based on the location data, quantity data identifying quantities of the users located on multiple paths of the geographical area. The device may process the geographical data, the location data, and the quantity data, with a machine learning model, to identify a path with less than a threshold quantity of users in the geographical area. The device may perform one or more actions based on the path.

20 Claims, 12 Drawing Sheets

(56) References Cited

U.S. PATENT DOCUMENTS

| | | | |
|---|---|---|---|
| 2017/0176190 A1* | 6/2017 | Harvey | G06N 20/00 |
| 2018/0190111 A1* | 7/2018 | Green | G06V 20/52 |
| 2019/0147372 A1* | 5/2019 | Luo | G06N 3/08 |
| | | | 706/20 |
| 2019/0204842 A1* | 7/2019 | Jafari Tafti | B60W 30/00 |
| 2019/0378202 A1* | 12/2019 | Belke | G06F 16/9554 |
| 2020/0033151 A1* | 1/2020 | Seshadri | G06Q 20/20 |
| 2020/0074320 A1* | 3/2020 | Seshadri | G06N 5/04 |
| 2020/0080848 A1* | 3/2020 | Sprague | G01C 21/3867 |
| 2020/0242902 A1* | 7/2020 | Derickson | G08B 7/062 |
| 2020/0364819 A1* | 11/2020 | de Hoog | G06Q 90/205 |
| 2021/0110683 A1* | 4/2021 | Guan | G01C 21/3461 |
| 2021/0215496 A1* | 7/2021 | Sese | G01C 21/3697 |
| 2021/0264388 A1* | 8/2021 | Kumar | G06Q 20/3224 |
| 2022/0051034 A1* | 2/2022 | Iwata | G08G 1/01 |

OTHER PUBLICATIONS

R. Gao et al., "Multi-Story Indoor Floor Plan Reconstruction via Mobile Crowdsensing," in IEEE Transactions on Mobile Computing, vol. 15, No. 6, pp. 1427-1442, Jun. 1, 2016, doi: 10.1109/TMC.2016.2550040. (Year: 2016).*

* cited by examiner

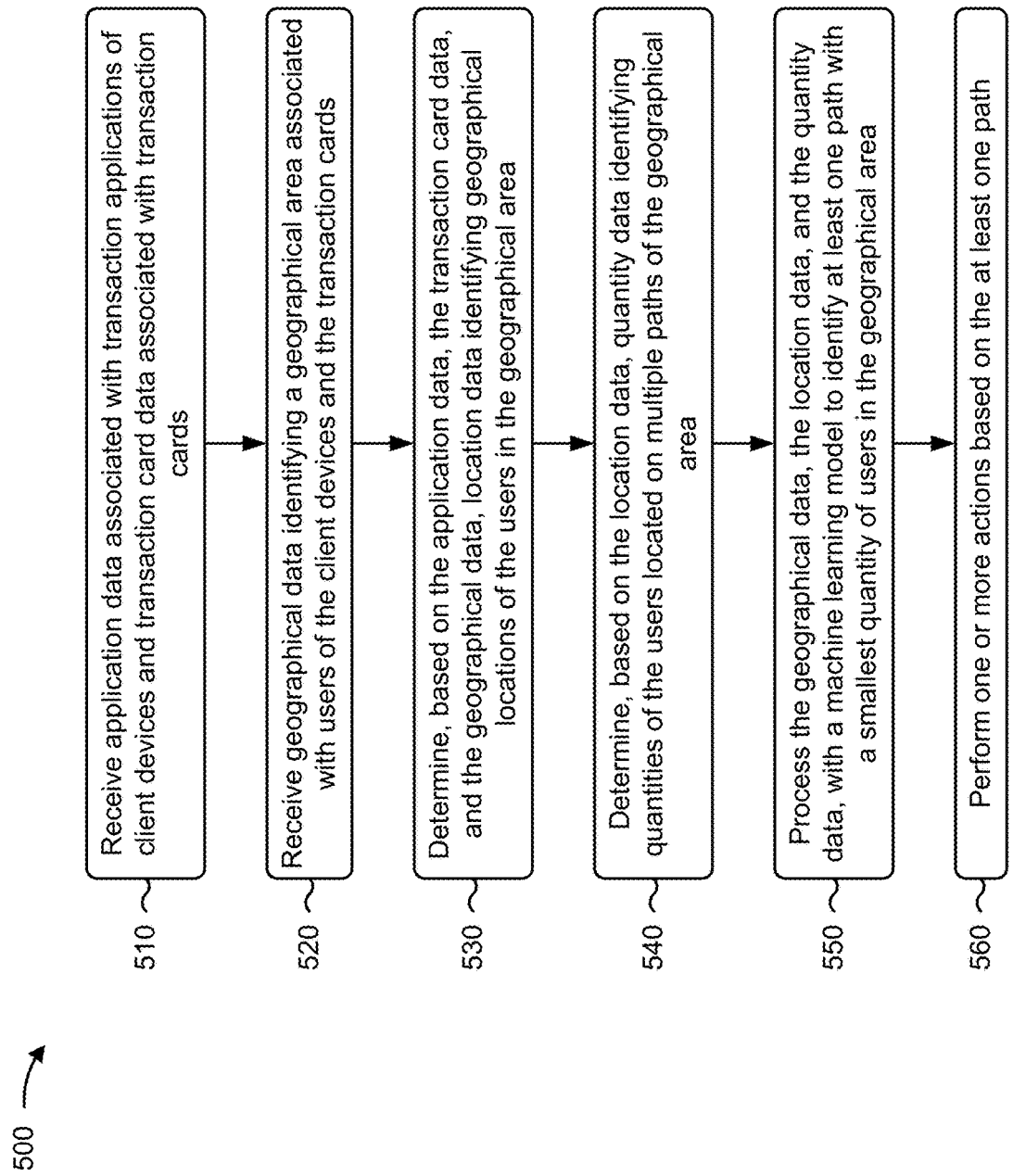

UTILIZING MACHINE LEARNING AND A NETWORK OF TRUST FOR CROWD AND TRAFFIC CONTROL AND FOR MAPPING A GEOGRAPHICAL AREA

BACKGROUND

A client device may obtain geographical data and use the geographical data to generate a geographical map. The client device may provide the geographical map on ap display. The geographical map may enable a user to navigate a geographical area corresponding to the geographical map.

SUMMARY

In some implementations, a method includes receiving, by a device, application data associated with transaction applications of client devices and transaction card data associated with transaction cards; receiving, by the device, geographical data identifying a geographical area associated with users of the client devices and the transaction cards; determining, by the device and based on the application data, the transaction card data, and the geographical data, location data identifying geographical locations of the users in the geographical area; determining, by the device and based on the location data, quantity data identifying quantities of the users located on multiple paths of the geographical area; processing, by the device, the geographical data, the location data, and the quantity data, with a machine learning model to identify a path with less than a threshold quantity of users in the geographical area; and performing, by the device, one or more actions based on the path.

In some implementations, a device includes one or more memories; and one or more processors, communicatively coupled to the one or more memories, configured to: receive application data associated with transaction applications of client devices and transaction card data associated with transaction cards; receive geographical data identifying a geographical area associated with users of the client devices and the transaction cards; determine, based on the application data, the transaction card data, and the geographical data, location data identifying geographical locations of the users in the geographical area; determine, based on the location data, quantity data identifying quantities of the users located on multiple paths of the geographical area; process the geographical data, the location data, and the quantity data, with a machine learning model to identify an optimal path for a set of the users in the geographical area, wherein the machine learning model is trained based on: historical geographical data, historical location data, and historical quantity data; and perform one or more actions based on the optimal path.

In some implementations, a non-transitory computer-readable medium storing instructions includes one or more instructions that, when executed by one or more processors, cause the one or more processors to: receive application data associated with transaction applications of client devices and transaction card data associated with transaction cards; receive geographical data identifying a geographical area associated with users of the client devices and the transaction cards, wherein the geographical area includes one or more of: an amusement park, an arena, a stadium, a parking lot, a shopping mall, or a store; determine, based on the application data, the transaction card data, and the geographical data, location data identifying geographical locations of the users in the geographical area; determine, based on the location data, quantity data identifying quantities of the users located on multiple paths of the geographical area; process the geographical data, the location data, and the quantity data, with a machine learning model to identify a path with less than a threshold quantity of users in the geographical area; and perform one or more actions based on the path.

BRIEF DESCRIPTION OF THE DRAWINGS

FIG. 5 is a flow chart of an example process for utilizing machine learning and network of trust for crowd and traffic control and for mapping a geographical area.

DETAILED DESCRIPTION

Figure 1A:
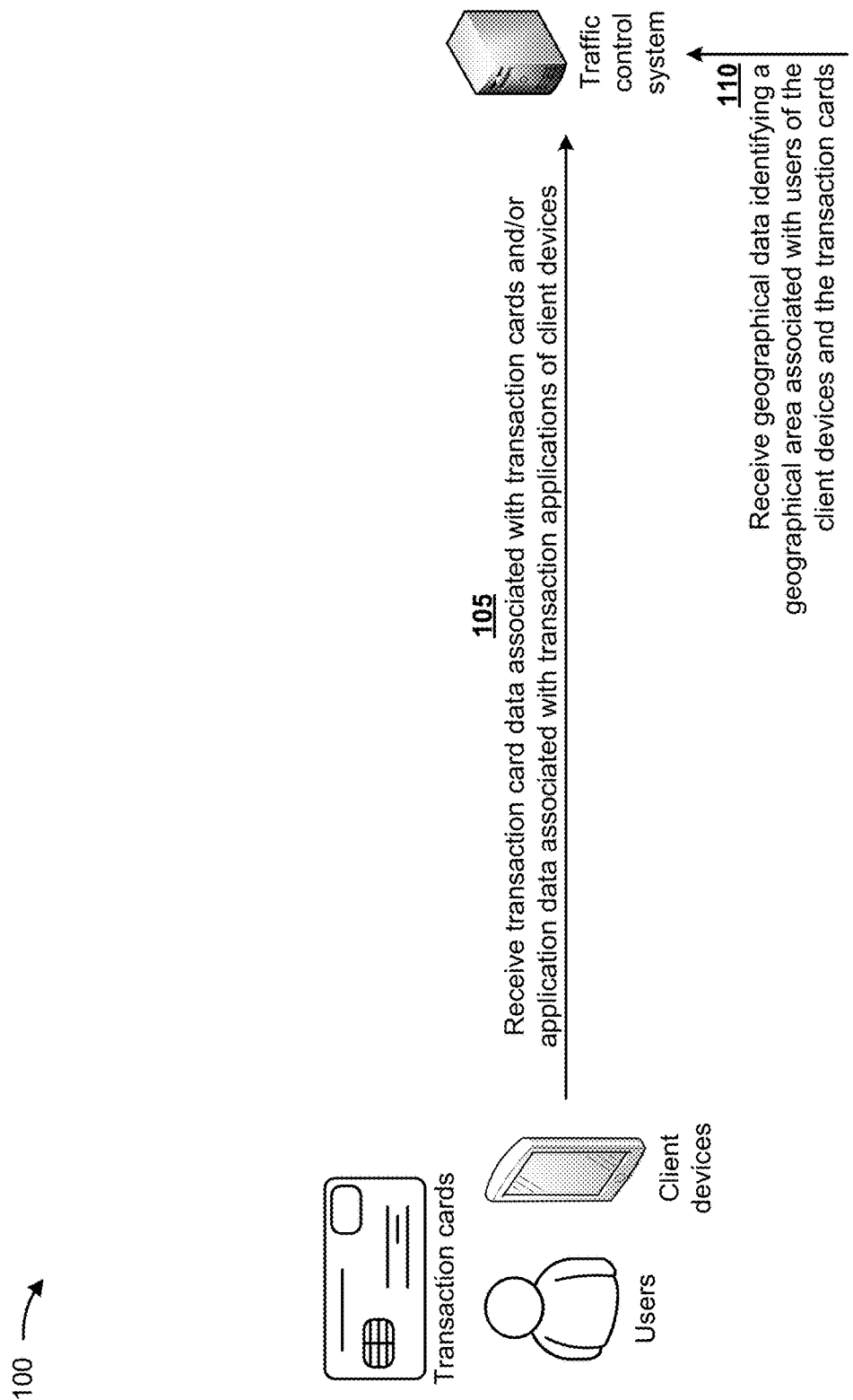
FIGS. 1A-1H are diagrams of one or more example implementations described herein.

The following detailed description of example implementations refers to the accompanying drawings. The same reference numbers in different drawings may identify the same or similar elements.

Customers may visit a venue (e.g., an amusement park, an arena, a stadium, a shopping mall, a store, and/or the like). As additional customers visit the venue, the crowd level may become large. Such large crowds may create congestion at the venue (e.g., due to the large amount of people located at the venue and a corresponding large amount of vehicles in a parking lot of the venue). Customers may desire to leave the venue (e.g., due to the congestion). For example, a customer may use a client device to attempt to identify the path and to generate a map that includes the path.

Current navigation applications may be used, by client devices, for mapping and routing of vehicles with well-defined roadways. However, similar mapping and routing of customers in a venue may be more difficult to determine because the venue may not include clearly defined paths for routing customers. Satellite imagery (e.g., images obtained from one or more satellites) and/or real-time image analysis and processing may be used to determine locations of customers in venues. However, satellite imagery and/or real-time image analysis and processing unnecessarily and/or disproportionately consumes computing resources, network resources, and/or the like of the client devices. Additionally, the client devices may not have the capability to obtain satellite imagery and/or perform such satellite imagery and/or real-time image analysis and processing.

Some implementations described herein provide a traffic control system that generates a map of a geographical area associated with a venue and identifies a path in the geographical area without any prior information regarding the geographical area. As an example, the traffic control system may use machine learning, data from transaction applications, and data associated with transaction cards to identify a path with less than a threshold quantity of users at the geographical area. The traffic control system may generate the map of the geographical area using machine learning, the data from the transaction applications, and the data associated with the transaction cards.

By using machine learning, the data from the transaction applications, and the data associated with the transaction cards to identify the path with a smallest quantity of users (e.g., without any prior information regarding the geographical area), the traffic control system may conserve computing resources, networking resources, and/or the like that a client device would have otherwise used to identify a path using satellite imagery and/or real-time image analysis and processing. Additionally, by generating the map of the geographical area (e.g., using machine learning, the data from the transaction applications, and the data associated with the transaction cards), the traffic control system may conserve computing resources, networking resources, and/or the like that a client device would have otherwise used to generate the map using satellite imagery and/or real-time image analysis and processing.

FIGS. 1A-1H are diagrams of one or more example implementations 100 associated with utilizing machine learning and a network of trust for crowd and traffic control and for mapping a geographical area. As shown in FIG. 1A, client devices may be associated with transaction cards and a traffic control system. The client devices may include mobile devices, computers, and/or the like, and may be associated with users. The transaction cards may include credit cards, debit cards, rewards cards, prepaid cards, gift cards, payment cards, automated teller machine cards, stored-value cards, fleet cards, and/or the like, and may be associated with the users. The transaction cards may store and communicate data with the client devices. The traffic control system may include one or more devices that utilize machine learning and a network of trust for crowd and traffic control and for mapping a geographical area, as described herein.

As further shown in FIG. 1A, and by reference number 105, the traffic control system may receive transaction card data associated with the transaction cards and/or application data associated with transaction applications of the client devices. In some implementations, the transaction cards may include smart transaction cards that are capable of communicating wirelessly (e.g., via Bluetooth, Bluetooth Low Energy (BLE), near-field communication (NFC), and/or the like) with a computing device (e.g., a client device, a digital wallet, a point of sale (POS) device, and/or another device) in order to complete a transaction. The transaction card data may include data identifying types of transactions, locations (e.g., geographical locations) of the transaction cards, dates and/or times at which the transaction cards were used, and/or the like.

The transaction applications may include mobile transaction card applications, mobile banking applications, and/or the like. The application data may include data regarding applications, of the client devices, that are used to conduct transactions. For example, the application data may include a portion or an entirety of the transaction card data, data identifying locations (e.g., geographical locations), and/or the like associated with users of the client devices, data identifying types of transactions (e.g., purchase, lease, rent), locations (e.g., geographical locations) associated with the transactions, locations (e.g., geographical locations) of transaction terminals associated with the transactions, dates and/or times associated with the transactions, and/or the like. The locations (e.g., geographical locations) associated with the users of the client devices may include locations (e.g., geographical locations) of the client devices.

Any collection, storage, and use of personal information (e.g., transaction data and application data) is subject to consent of the users to such activity and is in accordance with all applicable laws concerning protection of personal information. Storage and use of such personal information is done in an appropriately secure manner reflective of the type of such personal information.

In some implementations, the traffic control system may receive a path request to identify a path in a geographical area associated with a venue and/or to generate a map of the geographical area. The path request may be received from a client device located at the venue, from a device of an operator of the venue, and/or the like. The path request may include location information identifying a venue location. The venue location may include a location of the venue (e.g., geographical coordinates, a street address, and/or the like), a location of the client device (e.g., geographical coordinates, a street address, and/or the like), and/or the like. The venue may include an amusement park, an arena, a stadium, a shopping mall, a store, and/or the like.

Based on receiving the path request, the traffic control system may transmit a data request, to a data structure (e.g., a database, a linked list, a table, and/or the like), for transaction card data and/or application data associated with the location information. In some implementations, the data structure may be included in the traffic control system. Alternatively, the data structure may be separate from and/or located remotely from the traffic control system.

The data request may include the location information, information identifying a threshold distance, information identifying a threshold amount of time, information identifying a threshold quantity of users, and/or the like to be used to identify the path and/or generate the map. The threshold distance may be used to identify transaction cards and/or client devices that are within a vicinity of the venue location. The threshold amount of time may be used to identify transaction cards and/or client devices that conducted transactions within a period of time of a date and/or time associated with the data request. The threshold quantity of users may be used to identify a path with a particular quantity of users. For example, the path (e.g. requested by the path request) may correspond to a path with less than the threshold quantity of users. In some implementations, the threshold distance, the threshold amount of time, and/or the threshold quantity of users may be included in the path request. Additionally, or alternatively, the threshold distance, the threshold amount of time, and/or the threshold quantity of users may be determined by the traffic control system (e.g., based on previous path requests, based on a prior configuration, based on stored information, and/or the like).

The data structure may receive transaction card data associated with a plurality of transaction cards and application data associated with a plurality of client devices. In some implementations, the plurality of transaction cards may be configured to cause the transaction card data to be transmitted based on completing a single transaction, based on completing a first threshold quantity of transactions, based on a first date and/or time, and/or the like. For example, a transaction card may cause a device (e.g., a client device, a point of sale device, a transaction terminal, and/or another device) associated with the transaction card to transmit transaction card data after completing a single transaction, after completing the first threshold quantity of transactions, based on the first date and/or time, and/or the like. For instance, the transaction card may transmit the transaction card data to the device and cause the device to transmit the transaction card data to the data structure. Alternatively, the transaction card may transmit the transaction card data to the data structure. As an example, the transaction card data may include information identifying a location of the transaction card and a timestamp (e.g., date, time, and/or the like) of a transaction for which the transaction card was used.

In some implementations, the plurality of client devices may be configured to transmit the application data based on completing a single transaction, based on completing a second threshold quantity of transactions, based on a second date and/or time, and/or the like. For example, a client device may transmit application data after completing a single transaction, after completing the second threshold quantity of transactions, based on the second date and/or time, and/or the like. As an example, the application data may include information identifying a location of the client device and a timestamp (e.g., date, time, and/or the like) of a transaction that the client device completed (e.g., using a mobile banking application, a mobile transaction card application, and/or the like).

Based on the data request, the data structure may identify the transaction card data associated with the transaction cards from the transaction card data associated with the plurality of transaction cards and/or identify the application data associated with the transaction applications of the client devices from the application data associated with the plurality of transaction applications of the plurality of client devices. The transaction cards may correspond to transaction cards, out of the plurality of transactions cards, that are located within the threshold distance of the venue location and that conducted transactions within the threshold amount of time of the date and/or time associated with the data request. The client devices may correspond to client devices, out of the plurality of client devices, that are located within the threshold distance of the venue location and that conducted transactions within the threshold amount of time of a date and/or time associated with the data request.

The traffic control system may receive the transaction card data associated with the transaction cards and/or the application data associated with the transaction applications of the client devices, from the data structure, based on the data request. The traffic control system may use the transaction card data and/or the application data to identify the path in the geographical area and/or to generate the map of the geographical area, as described in more detail below.

By using the transaction card data associated with the transaction cards and/or the application data associated with the transaction applications of the client devices, the traffic control system may conserve computing resources, networking resources, and/or the like that the traffic control system would have otherwise used to analyze the transaction card data associated with the plurality of transaction cards and/or the application data associated with the transaction applications of the plurality of client devices to identify the path in the geographical area and/or to generate the map of the geographical area.

In some implementations, the transaction cards and/or the client devices may correspond to trusted transaction cards and/or trusted client devices that transmit data (e.g., transaction data and/or application data) that is trusted, accurate, valid, and/or the like. For example, the traffic control system may determine that the transaction cards and/or the client devices are trusted transaction cards and/or trusted client devices because the traffic control system has previously accurately identified paths in geographical areas and/or generated maps of the geographical areas based on historical data transmitted by the transaction cards and/or the client devices.

The historical data may include data identifying geographical locations (e.g., the transaction cards and/or the client devices) included in historical transaction data and/or historical application data. The traffic control system may determine that the paths in the geographical areas were accurately identified and/or that the maps of the geographical areas were accurately generated based on historical feedback regarding the paths and the maps. In some implementations, the trusted transaction cards and/or the trusted client devices may form a network of trusted transaction cards and/or trusted client devices (e.g., a network of trust) that may communicate securely (e.g., using one or more secure communication algorithms) with each other.

The network of trusted transaction cards and/or trusted client devices may enable a particular trusted transaction card or trusted client device, that is unable to communicate directly with the traffic control system and/or the data structure (e.g., due to does not have a signal or strong enough signal), to communicate with the traffic control system and/or the data structure via another trusted transaction card or another trusted client device in the network of trusted transaction cards and/or trusted client devices. As an example, the particular transaction trusted card or trusted client device may be unable to communicate directly with the traffic control system and/or the data structure due to diminished communication capability of the particular trusted transaction card or trusted client device (e.g., due to lack of a signal, due to a signal that does not satisfy a threshold signal strength, due to limitation in a network coverage (e.g., cellular coverage), and/or the like).

The traffic control system may use such transaction card data and/or application data to accurately and efficiently identify the path in the geographical area and/or to generate the map of the geographical area, as described in more detail below. By using such transaction card data and/or application data, the traffic control system may conserve computing resources, networking resources, and/or the like that the traffic control system would have otherwise used to re-identify paths that are inaccurately identified, re-generate maps that are inaccurately identified, and/or the like based on transaction card and/or application data that are inaccurate, invalid, not trusted, and/or the like.

As further shown in FIG. 1A, and by reference number 110, the traffic control system may receive geographical data identifying a geographical area associated with users of the client devices and the transaction cards. The geographical data may include data identifying global position system (GPS) coordinates of geographical boundaries that define the geographical area, points of interest within the geographical area, roads, streets, highways, parking lots, parking spaces, paths, routes, walkways, sidewalks, and/or the like within the geographical area, and/or the like. The geographical area may include the venue.

Assume that the geographical area includes an amusement park. In this case, the geographical data may include data identifying GPS coordinates of boundaries of the amusement park, points of interest within the amusement park, roads, streets, parking lots, parking spaces, and/or the like within the amusement park, and/or the like.

Based on receiving the path request, the traffic control system may transmit a geographical area request for the geographical data identifying the geographical area. The geographical area request may include the location information, the information identifying the threshold distance, and/or the like. The geographical area request may be transmitted to one or more devices that store geographical data identifying a plurality of geographical areas. For example, based on receiving the path request, the traffic control system may establish a communication session with a geographical information system and transmit the geographical area request to the geographical information system via the communication session. The geographical area request may cause the geographical information system to identify the geographical area out of the plurality of geographical areas and identify the geographical data identifying the geographical area out of the geographical data identifying the plurality of geographical area.

Based on the location information, the information identifying the threshold distance, and/or the like, the geographical information system may identify, as the geographical data, data that identifies an area surrounding the venue location (e.g., an area encompassing the threshold distance from the venue location), geographical boundaries that define the venue, and/or the like. In some implementations, the geographical information may identify the geographical data based on information identifying the venue (e.g., a name of the venue, a description of the venue, and/or the like) without using the location information. The geographical locations of the client devices and the transaction cards may be included in the area encompassing the threshold distance from the venue location. Accordingly, the geographical area may correspond to a geographical area associated with the users of the client devices and the transaction cards.

By using the geographical area and the geographical data identifying the geographical area, the traffic control system may conserve computing resources, networking resources, and/or the like that the traffic control system would have otherwise used to analyze the plurality of geographical areas and the geographical data identifying the plurality of geographical areas in order to identify the path in the geographical area and/or to generate the map of the geographical area.

While the actions described in connection with FIG. 1A above (and FIGS. 1B-1H below) may be described as being performed based on receiving the path request, such actions may be performed periodically (e.g., every thirty minutes, every hour, every day, and/or the like) without receiving a path request. By periodically performing the actions, the traffic control system may be able to respond to a path request in a timely manner.

Figure 1B:
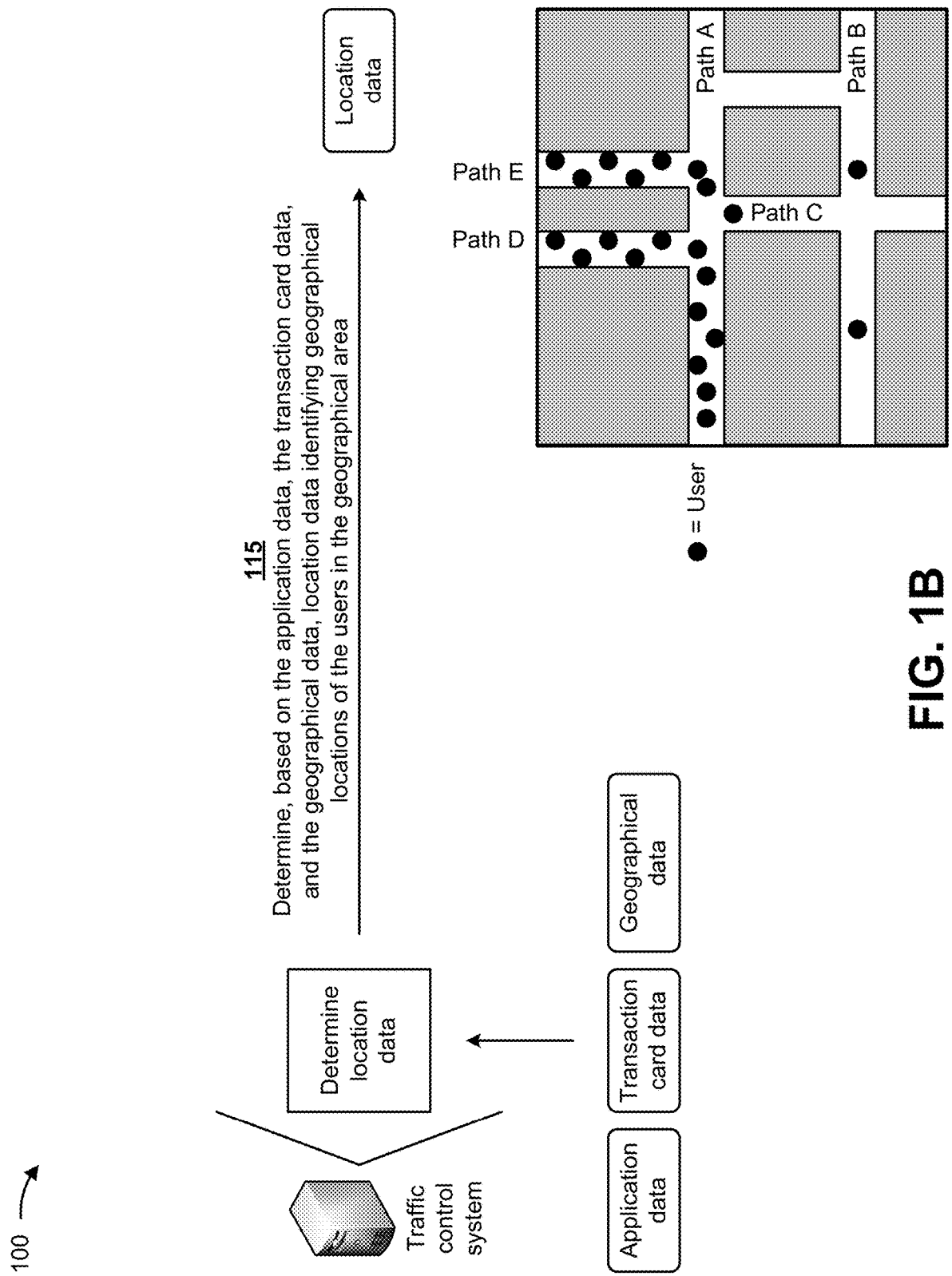

As shown in FIG. 1B, and by reference number 115, the traffic control system may determine, based on the application data, the transaction card data, and the geographical data, location data identifying geographical locations of the users in the geographical area. For example, based on receiving the path request, the traffic control system may determine the location data identifying geographical locations of the users (e.g., the users associated with the transaction cards and the users associated with the client devices) in the geographical area. The location data may include GNSS data (e.g., GPS data, global navigation satellite system (GLONASS) data, Galileo data, BeiDou (BDS) data, and/or the like) identifying the geographical locations of the client devices and of the transactions cards. Accordingly, the GNSS data may identify the geographical locations of the user.

The traffic control system may determine the geographical locations of the client devices and the geographical locations of the transaction cards in the geographical area. For example, the traffic control system may compare the geographical locations of the client devices (included in the application data) and the geographical boundaries (included in the geographical data) that define the geographical area to determine the geographical locations of the client devices within the geographical area. Similarly, the traffic control system may compare the geographical locations of the transaction cards (included in the transaction card data) and the geographical boundaries (included in the geographical data) that define the geographical area to determine the geographical locations of the transaction cards within the geographical area.

Based on the comparisons, the traffic control system may determine the geographical locations of the users (e.g., the users of the client devices and the users of the transaction cards) within the geographical area. For example, based on the comparisons, the traffic control system may determine the geographical locations of groups of users (e.g., one or more users) located at different portions of the geographical area.

Based on determining the geographical locations of the groups of users, the traffic control system may determine multiple paths within the geographical area. For example, the traffic control system may determine that one or more geographical locations of a group of users form a particular path in the geographical area. As an example, the traffic control system may determine the particular path based on a threshold number of users located along a flow of users (e.g., a direction of travel of users) in a portion of the geographical area, a threshold distance between the users located along the flow of users in the portion of the geographical area, and/or the like. For instance, the traffic control system may determine a first path based on one or more geographical locations of a first group of users located at a first portion of the geographical area, a second path based on one or more geographical locations of a second group of users located at a second portion of the geographical area, and so on.

In some implementations, the traffic control system may determine geographical boundaries of each path based on the geographical locations of the group of users forming the path. As shown in FIG. 1B, for example, the traffic control system may identify Path A, Path B, Path C, Path D, and Path E within the geographical area. The location data may include information identifying the multiple paths. The information identifying a path may include an identifier of the path, information identifying one or more geographical locations of a group of users that form the path, information identifying the geographical boundaries of the path, and/or the like. The traffic control system may determine the location data in order to identify the path with less than the threshold quantity of users in the geographical area, based on receiving the path request.

In some implementations, the traffic control system may collect and store the application data, the transaction card data, the geographical data, and/or the location data (collectively "collected data") over a period of time. Collecting and storing the collected data over a period of time may enable the traffic control system to determine the flow of users along the multiple paths and identify one or more paths with less than the threshold quantity of users. For example, while a particular path may appear to have users that satisfy the threshold quantity of users at first time, the flow of users may enable the traffic control system to determine that users, on the particular path, are moving out of the geographical area. Accordingly, the traffic control system may predict that the particular path may be a path with less than the threshold quantity of users at a second time (that follows the first time). Therefore, the traffic control system may recommend that the particular path for a user anticipating to leave the geographical area at the second time.

In some implementations, the traffic control system may store the application data, the transaction card data, the geographical data, and/or the location data in a data structure (e.g., a database, a table, a list, and/or the like) associated with the traffic control system. In practice, there may be hundreds, thousands, millions, and/or the like, of users, client devices, transaction cards, and geographical locations that produce thousands, millions, billions, and/or the like, of data points provided in the application data, the transaction card data, the geographical data, and/or the location data. In this way, the traffic control system may handle thousands, millions, billions, and/or the like, of data points within a period of time (e. g., daily, weekly, monthly), and thus may provide "big data" capability.

Figure 1C:
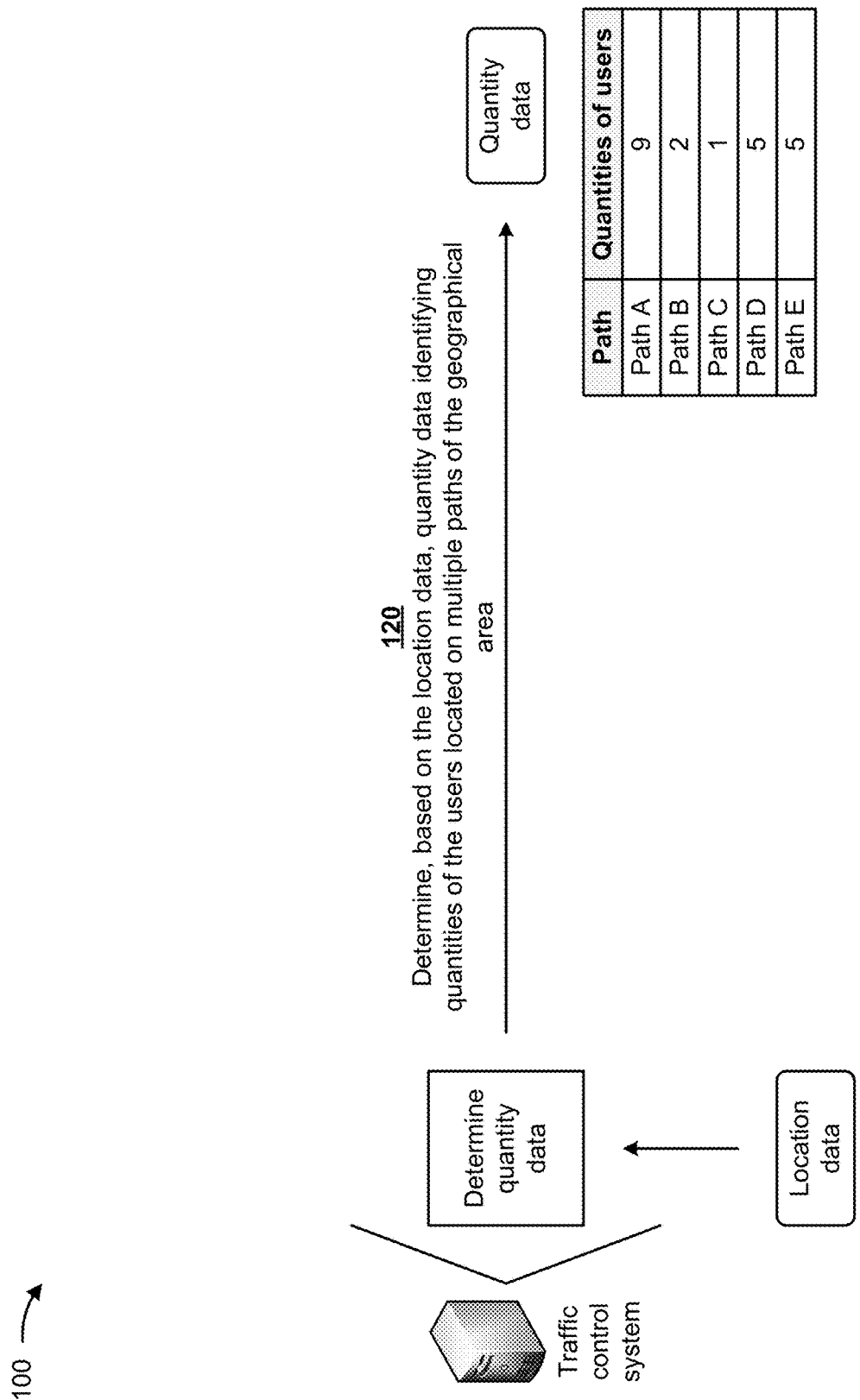

As shown in FIG. 1C, and by reference number 120, the traffic control system may determine, based on the location data, quantity data identifying quantities of the users located on multiple paths of the geographical area. In some implementations, the traffic control system may determine the quantity data based on receiving the path request. Based on the location data, the traffic control system may identify the geographical boundaries of the multiple paths and may determine a quantity of the geographical locations of the users that are located within the geographical boundaries of the multiple paths and a flow of users along the multiple paths.

For example, the traffic control system may identify the information identifying a first path (included in the location data), identify the information identifying the one or more geographical locations of a group of users that form the first path, and determine a quantity of the one or more geographical locations of the group of users that form the first path and a flow of users along the first path. The traffic control system may identify the information identifying a second path (included in the location data), identify the information identifying the one or more geographical locations of a group of users that form the second path, and determine a quantity of the one or more geographical locations of the group of users that form the second path and a flow of users along the second path.

Alternatively, based on the location data, the traffic control system may identify the geographical boundaries of a first path and determine a quantity of the geographical locations of a group of users that are located within the geographical boundaries of the first path. Based on the location data, the traffic control system may identify the geographical boundaries of a second path and determine a quantity of the geographical locations of a group of users that are located within the geographical boundaries of the second path, and so on.

Alternatively, the traffic control system may compare the geographical location of a first user and the geographical boundaries of a path to determine whether the geographical location of the first user is included in the geographical boundaries of the path, compare the geographical location of a second user and the geographical boundaries of the path to determine whether the geographical location of the second user is included in the geographical boundaries of the path, and so on. Based on the comparisons, the traffic control system may determine a quantity of users located on the path.

As shown in FIG. 1C, for example, the traffic control system may determine that nine (9) users are located on Path A, two (2) users are located on Path B, one (1) user is located on Path C, five (5) users are located on Path D, and five (5) users are located on Path E. The traffic control system may determine the quantity data in order to identify the path with less than the threshold quantity of users in the geographical area, based on receiving the path request. Additionally, the traffic control system may determine the flow of users along the multiple paths.

For example, the traffic control system may determine whether the users, located on a particular path, are moving or are not moving. If the users are moving, the traffic control system may determine the flow of the users (e.g., the direction of travel of the users). For instance, in addition to identifying a particular path with less than the threshold quantity of users, the traffic control system may determine whether users, on the particular path, are not moving or are traveling in a same direction as the user associated with the path request. As an example, the traffic control system may rank a first path with less than the threshold quantity of users and with users that are not moving or are traveling in a same direction as the user associated with the path request higher than a second path with less than the threshold quantity of users and with users that are traveling in a direction opposite with respect to a traveling direction of the user associated with the path request. In this regard, the first path may better facilitate exiting the geographical area than the second path.

Figure 1D:
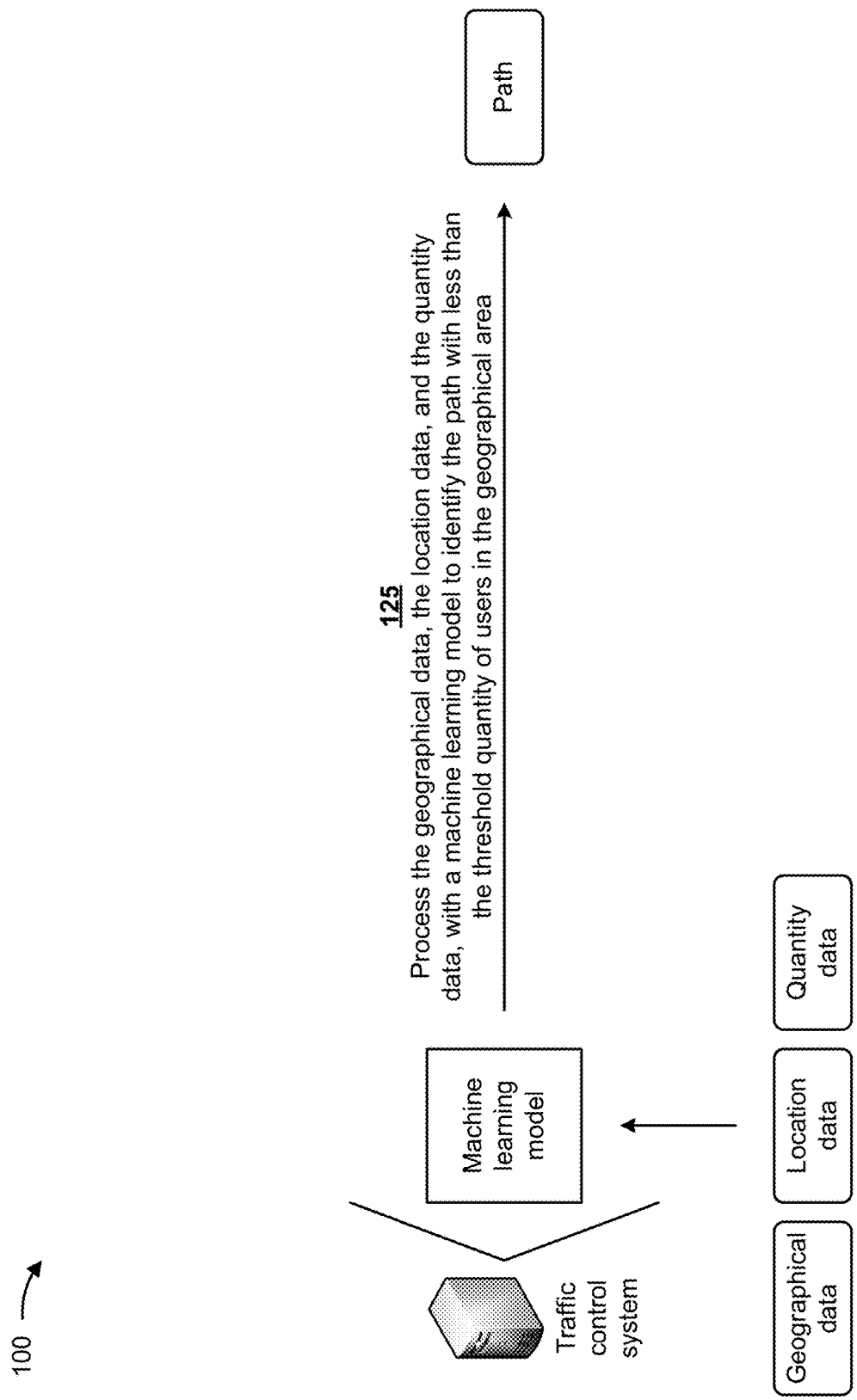

As shown in FIG. 1D, and by reference number 125, the traffic control system may process the geographical data, the location data, and the quantity data, with a machine learning model to identify the path with less than the threshold quantity of users in the geographical area. In some implementations, the traffic control system may train the machine learning model with historical data to identify paths with less than the threshold quantity of users in geographical areas and with flows of users that may facilitate exiting the geographical areas.

The historical data may include historical geographical data identifying historical geographical areas, historical location data identifying historical geographical locations of users, historical data identifying historical path requests, historical quantity data identifying historical quantities of users located on historical paths of the historical geographical areas, historical data identifying the historical paths (e.g., data indicating distances traveled along the historical paths, whether the historical paths are direct paths, obstructions along the historical paths, and/or the like), historical data identifying the historical geographical areas, historical data identifying historical flows of users, and/or the like. As a result of training, the machine learning model may be used to identify (or predict) paths with less than the threshold quantity of users in geographical areas and with flows of users that may facilitate exiting the geographical areas.

The traffic control system may train the machine learning model in a manner similar to the manner described below in connection with FIG. 2. Alternatively, rather than training the machine learning model, the traffic control system may obtain the machine learning model from another system or device that trained the machine learning model. In this case, the other system or device may obtain the historical data (e.g., the historical data discussed above) for use in training the machine learning model, and may periodically receive additional data that the other system or device may use to retrain or update the machine learning model. In some implementations, the traffic control system may periodically obtain additional data (e.g., additional geographical data, location data, and/or quantity data) that the traffic control system may use to retrain or update the machine learning model, as described below.

When processing the geographical data, the location data, and the quantity data, the traffic control system may apply the machine learning model to a new observation in a manner similar to the manner described below in connection with FIG. 2. For example, the traffic control system may analyze the geographical data, the location data, and the quantity data using the machine learning model trained based on the historical data discussed above. Based on analyzing the geographical data, the location data, and the quantity data, the traffic control system (e.g., using the machine learning) may predict (or identify) a path with less than the threshold quantity of users and with a flow of users that may facilitate exiting the geographical area. The geographical data, the location data, and the quantity data may be correspond to an input of the machine learning model and the path may correspond to an output of the machine learning model.

Figure 1E:
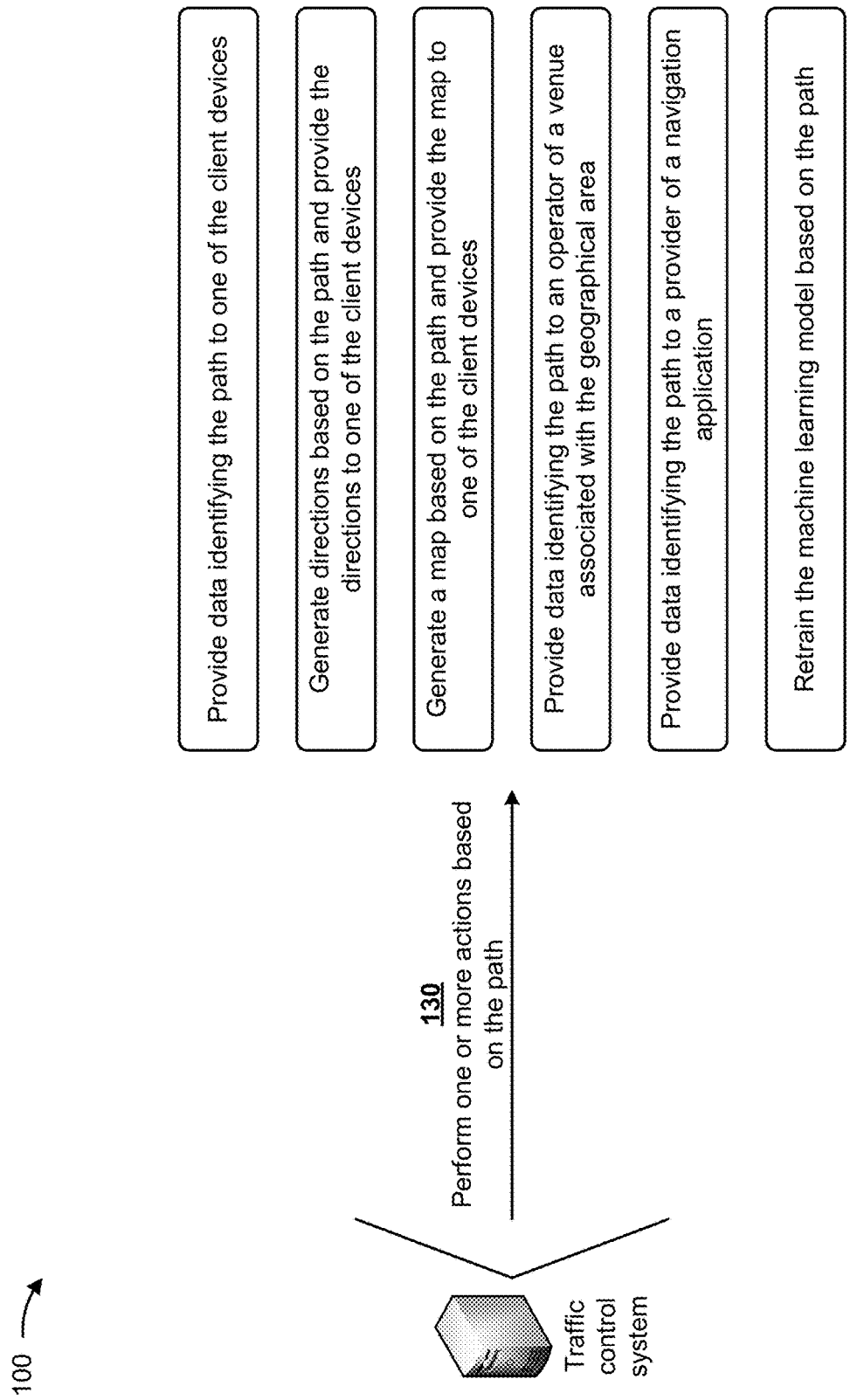

As shown in FIG. 1E, and by reference number 130, the traffic control system may perform one or more actions based on the path (e.g., identified based on the path request). In some implementations, the one or more actions may include the traffic control system providing data identifying the path to a client device. For example, the traffic control system may receive the path request from the client device. Based on receiving the path request, the traffic control system may provide the data identifying the path, to the client device, via a user interface that may be displayed by the client device. The traffic control system may, therefore, enable the client device to identify a path with less than the threshold quantity of users in the geographical area for a user of the client device. Accordingly, the traffic control system may conserve computing resources (e.g., processing resources, memory resources, communication resources, and/or the like), networking resources, and/or the like that would have otherwise been used by the client device (or another device) to identify the path using satellite imagery and real-time image analysis and processing.

In some implementations, the one or more actions may include the traffic control system generating directions based on the path and providing the directions to a client device. For example, the traffic control system may receive, from the client device, a request for directions to exit the geographical area. The traffic control system may calculate, based on the request, directions from a location of the client device to an exit of the geographical area via the path. The traffic control system may provide the directions, to the client device, via a user interface that may be displayed by the client device.

The traffic control system may, therefore, enable the client device to identify directions (e.g., including the path) to enable a user of the client device to exit the geographical area. Accordingly, the traffic control system may conserve computing resources (e.g., processing resources, memory resources, communication resources, and/or the like), networking resources, and/or the like that would have otherwise been used by the client device (or another device) to identify the path and generate the directions using satellite imagery and real-time image analysis and processing.

In some implementations, the one or more actions may include the traffic control system generating a map (e.g., a geographical map of the geographical area) based on the path and providing the map to a client device. For example, the traffic control system may receive, from the client device, a request for a map based on the path. Based on receiving the request, the traffic control system may generate the map based on the path. The map may include information identifying the path. In some implementations, the traffic control system may identify the least one path and the directions on the map. For example, the traffic control system may overlay the path and the directions on the map.

The traffic control system may provide the map, to the client device, via a user interface that may be displayed by the client device. The traffic control system may, therefore, enable the client device to provide the map to a user of the client device. Accordingly, the traffic control system may conserve computing resources (e.g., processing resources, memory resources, communication resources, and/or the like), networking resources, and/or the like that would have otherwise been used by the client device to analyze and process satellite imagery in order to generate the map.

In some implementations, the one or more actions may include the traffic control system providing data identifying the path to a device associated with an operator of a venue associated with the geographical area. For example, the traffic control system may receive, from a device of the operator, a request for the data identifying the path. Based on receiving the request, the traffic control system may provide the data identifying the path to the device of the operator. In some implementations, the traffic control system may periodically provide the data to the device of the operator (e.g., without receiving a request for the data).

In some implementations, the traffic control system may provide the data, to the client device, via a user interface that may be displayed by the device. By providing the data to the operator, the traffic control system may enable the operator to regulate a crowd level and traffic at the venue. For example, the data identifying the path may enable the operator to manage foot traffic and vehicle traffic at the venue. Accordingly, the traffic control system may conserve computing resources (e.g., processing resources, memory resources, communication resources, and/or the like), networking resources, and/or the like that would have otherwise been used by the device to determine the path using satellite imagery and real-time image analysis and processing.

In some implementations, the path may correspond to an optimal path in the geographical area. For example, the optimal path may be a path that includes less than the threshold quantity of users, is associated with a distance that is less than a threshold distance, is associated with an amount of turns that is less than a threshold amount of turns, is associated with an amount of changes of direction that is less than a threshold amount of changes of direction, and/or the like. One or more of the thresholds discussed herein may be included in the path request. Additionally, or alternatively, one or more of the thresholds discussed herein may be determined by the traffic control system (e.g., based on previous path requests).

In some implementations, the one or more actions may include the traffic control system providing data identifying the path to a device associated with a provider of a navigation application. For example, the traffic control system may receive, from the device associated with the provider of the navigation application, a request for the data identifying the path. Based on receiving the request, the traffic control system may provide the data identifying the path to the provider of the navigation application. By providing the data identifying the path to the provider, the traffic control system may enable the provider of the navigation application to provide the data to client devices of users of the navigation application. Accordingly, the traffic control system may conserve computing resources (e.g., processing resources, memory resources, communication resources, and/or the like), networking resources, and/or the like that would have otherwise been used by the client devices to determine the data identifying the path using satellite imagery and real-time image analysis and processing.

In some implementations, the one or more actions may include the traffic control system retraining the machine learning model based on the path. For example, after identifying the data identifying the path, the traffic control system may retrain the machine learning model based on the path to identify one or more paths with less than the threshold quantity of users in one or more geographical areas and with flows of users that facilitate exiting the one or more geographical areas. By retraining the machine learning model, the traffic control system may improve the accuracy of the machine learning model in processing the geographical data, the location data, and the quantity data to identify paths with less than the threshold quantity of users in a geographical area and flows of users that facilitate exiting the geographical area. Retraining the machine learning model in this manner may improve speed and efficiency of the machine learning model and conserve computing resources, networking resources, and/or the like that would have otherwise been used to identify paths with less than the threshold quantity of users in a geographical area in a less efficient manner.

Figure 1F:
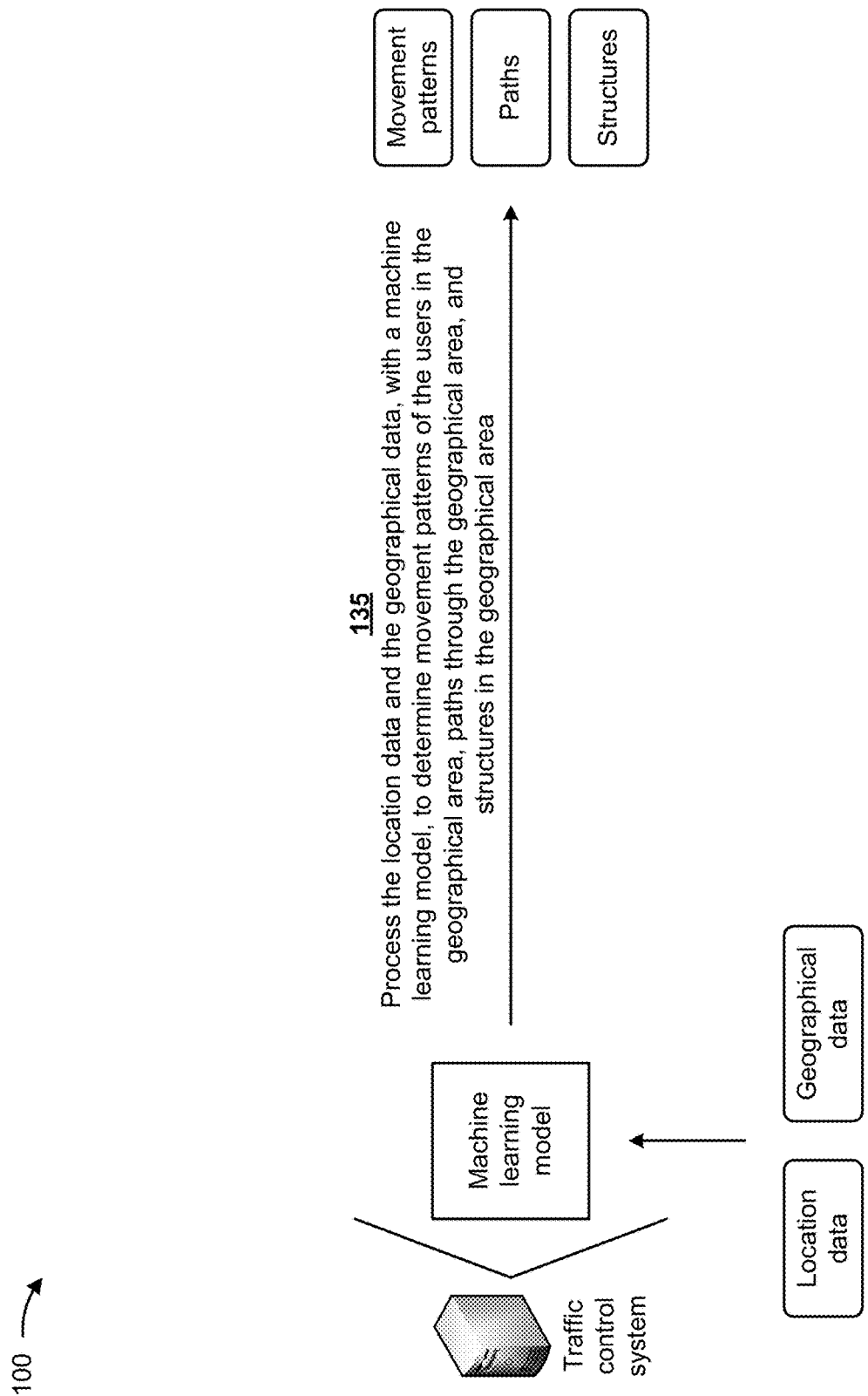

As shown in FIG. 1F, and by reference number 135, the traffic control system may process the location data and the geographical data, with a machine learning model, to determine movement patterns of the users in the geographical area, paths through the geographical area, and structures in the geographical area. For example, the machine learning model (hereinafter referred to as "movement machine learning model") may be the same as or similar to the machine learning model described above with respect to FIG. 1D, may be associated with the machine learning model described above with respect to FIG. 1D, may be included in or may include the machine learning model described above with respect to FIG. 1D, and/or the like.

In some implementations, the traffic control system may train the movement machine learning model with historical data to determine movement patterns of the users in the geographical area, different paths through the geographical area, and different structures in the geographical area. The historical data may include historical geographical data identifying historical geographical areas, historical location data identifying historical geographical locations of users, and/or the like. The traffic control system may train the movement machine learning model with the historical data using one or more machine learning algorithms to identify (or predict) movement patterns of users in geographical areas, paths through the geographical areas, and the structures in the geographical areas. The movement patterns of users in the geographical areas, the paths through the geographical areas, and the structures in the geographical areas may correspond to historical output data of the movement machine learning model.

The traffic control system may train the movement machine learning model in a manner similar to the manner described below in connection with FIG. 2. Alternatively, rather than training the movement machine learning model, the traffic control system may obtain the movement machine learning model from another system or device that trained the machine learning model. In this case, the other system or device may obtain the historical data (e.g., the historical data discussed above) for use in training the movement machine learning model, and may periodically receive additional data that the other system or device may use to retrain or update the movement machine learning model. In some implementations, the traffic control system may periodically obtain additional data (e.g., additional geographical data and/or location data) that the traffic control system may use to retrain or update the movement machine learning model.

When processing the geographical data and the location data, the traffic control system may apply the movement machine learning model to a new observation in a manner similar to the manner described below in connection with FIG. 2. For example, the traffic control system, using the movement machine learning model, may analyze the geographical data identifying the geographical area and the location data identifying the geographical locations of the users and may determine movement patterns of the users in the geographical area, paths through the geographical area, and structures in the geographical area.

For instance, the traffic control system may process the location data and the geographical data, with the movement machine learning model, to determine movement patterns of the users in the geographical area. As an example, the traffic control system may receive updated location data indicating movement or no movement of client devices and/or movement or no movement of transaction cards (e.g., movement or no movement of the users). The traffic control system may determine paths through the geographical area based on the movement patterns of the users in the geographical area. For example, movement of the users in a first portion of the geographical area may indicate a path in the first portion of the geographical area. Conversely, no movement of the users in a second portion of the geographical area may indicate that a path does not exist in the second portion of the geographical area.

The traffic control system may determine structures in the geographical area based on the movement patterns of the users in the geographical area. For example, no movement of the users (e.g., in a portion of the geographical area) may indicate a portion of the geographical area that prevents movement of the users. For instance, the traffic control system may determine that such portion of the geographical area is a structure that is obstructing the movement of the users. The structure may include an enclosed structure (e.g., a building), a portion of the enclosed structure (e.g., one or more walls), one or more shelves (e.g., inside the enclosed structure), one or more aisles (e.g., inside the enclosed structure), and/or the like.

The traffic control system may determine distances between the structures in the geographical area, dimensions of the structures, and/or the like. For example, the traffic control system may determine a distance between the structures by determining an edge (or a boundary) of a first structure, determining an edge (or a boundary) of a second structure, and determining a distance between the edge of the first structure and the edge of the second structure. For instance, the traffic control system may determine the edge of the first structure based on a location of a first group of users and determine the edge of the second structure based on a location of a second group of users.

The traffic control system may determine a length of a wall of a structure, a width of the wall, and/or the like based on movements of the users along and/or around the structure. For example, the traffic control system may determine a distance between a first edge of the wall and a second edge of the wall. For instance, the traffic control system may determine the first edge of the wall based on a location of a group of users and determine the second edge of the wall based on a location of another group of users.

Figure 1G:
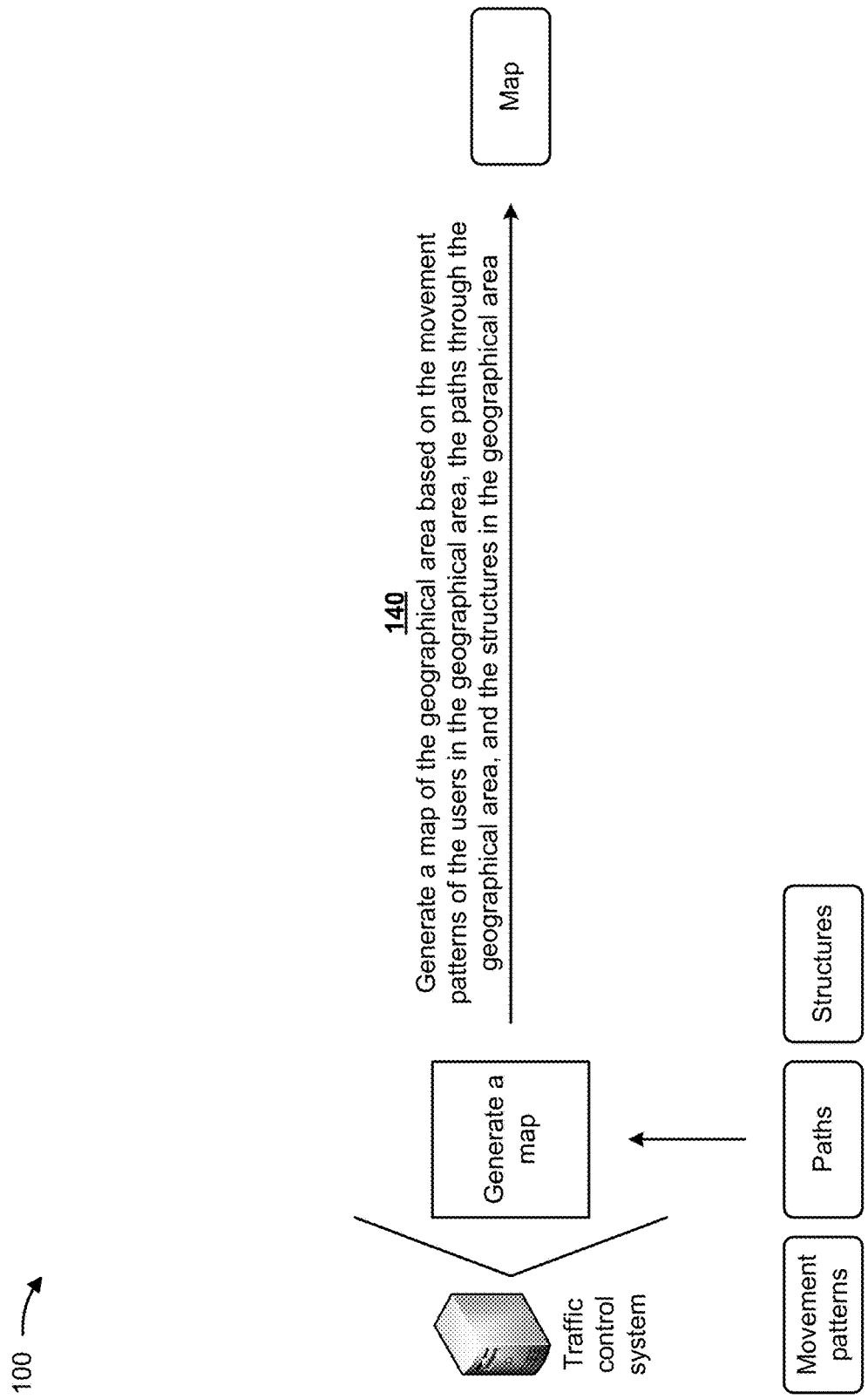

As shown in FIG. 1G, and by reference number 140, the traffic control system may generate a map of the geographical area based on the movement patterns of the users in the geographical area, the paths through the geographical area, and the structures in the geographical area. For example, based on receiving the path request, the traffic control system may use the different paths through the geographical area and the different structures in the geographical area (identified by the movement machine learning model) to generate a map identifying the paths through the geographical area, the structures in the geographical area, and/or the like.

For instance, if the geographical area includes a building (or a similar type of enclosed space), the traffic control system may generate a map that identifies an exterior of the building (e.g., one or more walls) and an interior of the building (e.g., one or more aisles, shelves, and/or the like). The map may further identify different paths through the building. In some implementations, the map may identify a quantity of users along each of the different paths. For example, the map may identify the quantity of users using different graphical indicators such as, for example, dots (e.g., each dot representing a user), colors (e.g., a different color for different quantities of users), and/or the like. As an example, a first color may represent a first range of quantity of users, a second color may represent a second range of quantity of users, and/or the like.

The traffic control system may perform one or more actions based on the map, as explained in more detail below in connection with FIG. 1H. By generating the map as described above, the traffic control system may conserve computing resources (e.g., processing resources, memory resources, communication resources, and/or the like), networking resources, and/or the like that would have otherwise been used to analyze satellite imagery in order to generate the map.

Figure 1H:
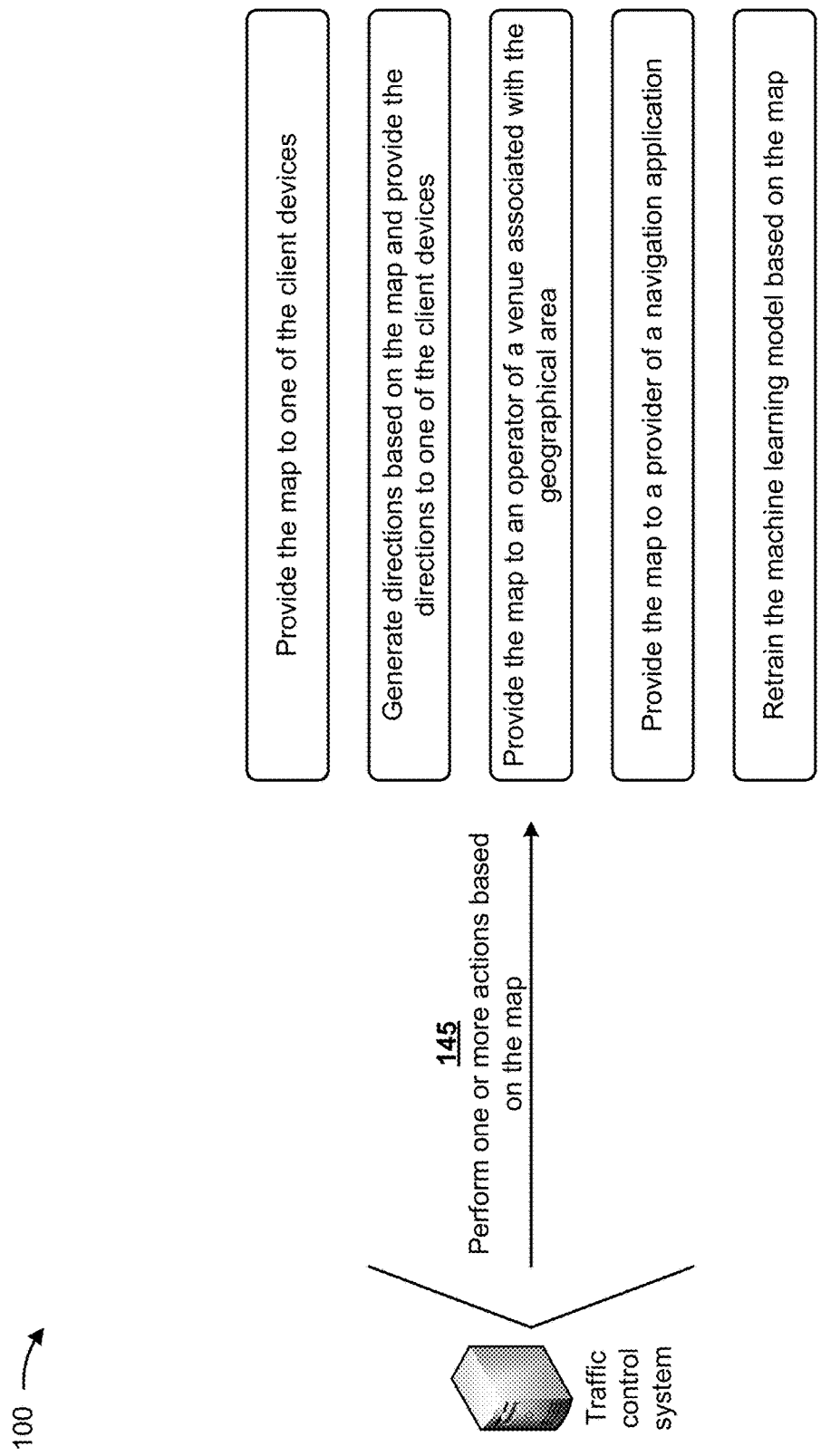

As shown in FIG. 1H, and by reference number 145, the traffic control system may perform one or more actions based on the map. In some implementations, the one or more actions may include the traffic control system providing the map to a client device. For example, the traffic control system may receive, from the client device, a request for the map. Based on receiving the request, the traffic control system may provide the map, to the client device, via a user interface that may be displayed by the client device. The traffic control system may, therefore, enable the client device to provide the map to a user of the client device. Accordingly, the traffic control system may conserve computing resources (e.g., processing resources, memory resources, communication resources, and/or the like), networking resources, and/or the like that would have otherwise been used by the client device to analyze satellite imagery in order to generate the map.

In some implementations, the one or more actions may include the traffic control system generating directions based on the map and providing the directions to a client device. For example, the traffic control system may receive, from the client device, a request for directions to exit the geographical area. The traffic control system may calculate, based on the request, directions from a location of the client device to an exit of the geographical area. The traffic control system may provide the directions with the map, to the client device, via a user interface that may be displayed by the client device. The traffic control system may, therefore, enable the client device to provide the map and the directions to enable a user of the client device to exit the geographical area. Accordingly, the traffic control system may conserve computing resources (e.g., processing resources, memory resources, communication resources, and/or the like), networking resources, and/or the like that would have otherwise been used by the client device to generate the directions and the map using satellite imagery and real-time image analysis and processing.

In some implementations, the one or more actions may include the traffic control system providing data identifying the map to a device associated with an operator of a venue associated with the geographical area. For example, the traffic control system may receive, from a device of the operator, a request for the map. Based on receiving the request, the traffic control system may provide the map to the device of the operator. In some implementations, the traffic control system may periodically provide the map to the device of the operator (e.g., without receiving a request for the data). In some implementations, the traffic control system may provide the map, to the client device, via a user interface that may be displayed by the device. By providing the map to the operator, the traffic control system may enable the operator to regulate a crowd level and traffic at the venue. For example, the map may enable the operator to manage foot traffic and vehicle traffic at the venue. Accordingly, the traffic control system may conserve computing resources (e.g., processing resources, memory resources, communication resources, and/or the like), networking resources, and/or the like that would have otherwise been used by the device to analyze satellite imagery in order to generate the map.

In some implementations, the one or more actions may include the traffic control system providing the map to a device associated with a provider of a navigation application. For example, the traffic control system may receive, from the device associated with the provider of the navigation application, a request for the map. Based on receiving the request, the traffic control system may provide the map to the provider of the navigation application. By providing the map to the provider, the traffic control system may enable the provider of the navigation application to provide the map to client devices of users of the navigation application. Accordingly, the traffic control system may conserve computing resources (e.g., processing resources, memory resources, communication resources, and/or the like), networking resources, and/or the like that would have otherwise been used by the client devices to generate the map using satellite imagery and real-time image analysis and processing.

In some implementations, the one or more actions include the traffic control system retraining the machine learning model based on the map. By retraining the machine learning model, the traffic control system may improve the accuracy of the machine learning model in processing the location data and the geographical data to generate a map that facilitates exiting the geographical area. Retraining the machine learning model in this manner may improve speed and efficiency of the machine learning model and conserve computing resources, networking resources, and/or the like that would have otherwise been used to generate maps in a less efficient manner.

As indicated above, FIGS. 1A-1H are provided merely as examples. Other examples may differ from what is described with regard to FIGS. 1A-1H.

Figure 2:
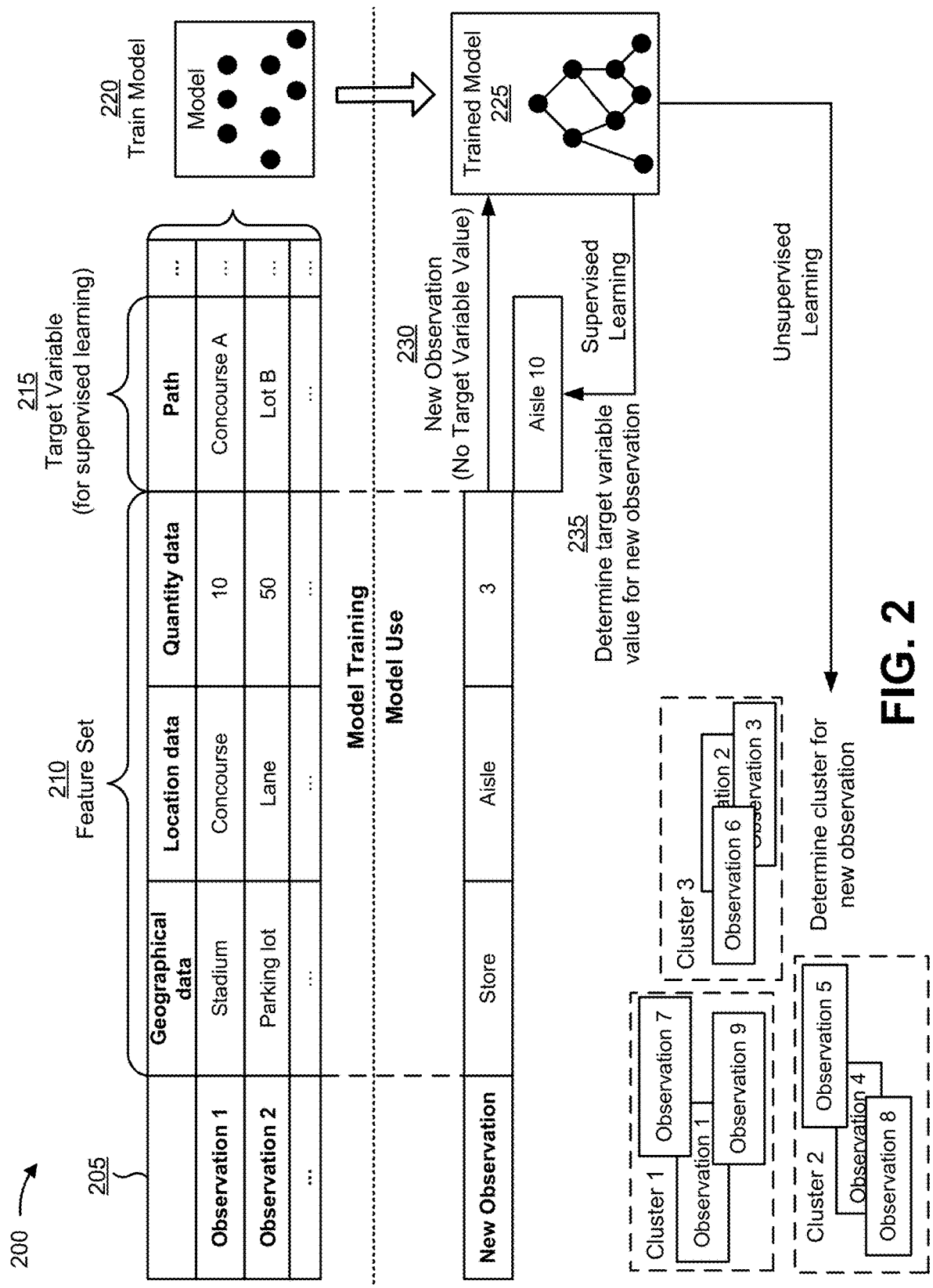
FIG. 2 is a diagram illustrating an example of training and using a machine learning model in connection with utilizing network of trust for crowd and traffic control and for mapping a geographical area.

FIG. 2 is a diagram illustrating an example 200 of training and using a machine learning model in connection with utilizing network of trust for crowd and traffic control and for mapping a geographical area. The machine learning model training and usage described herein may be performed using a machine learning system. The machine learning system may include or may be included in a computing device, a server, a cloud computing environment, and/or the like, such as traffic control system 301, client device 330, and transaction card 340 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from traffic control system 301, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from traffic control system 301. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of geographical data, a second feature of location data, a third feature of quantity data, and so on. As shown, for a first observation, the first feature may have a value of stadium, the second feature may have a value of concourse, the third feature may have a value of 10, and so on. These features and feature values are provided as examples, and may differ in other examples. For example, the feature set may include one or more of the following features: application data, transaction card data, flows of users, and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is path, which has a value of Concourse A for the first observation.

The feature set and target variable described above are provided as examples, and other examples may differ from what is described above. For example, for a target variable of movement patterns of users in a geographical area, the feature set may include location data and geographical data. As another example, for a target variable of structures in a geographical area, the feature set may include location data and geographical data.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of geographical data, a second feature of location data, a third feature of quantity data, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of aisle 10 for the target variable of path for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, recommend aisle 10 as a path. The first automated action may include, for example, generate directions based on the path via aisle 10 and provide the directions.

As another example, if the machine learning system were to predict a value of aisle 9 for the target variable of path, then the machine learning system may provide a second (e.g., different) recommendation (e.g., recommend map based on aisle 9) and/or may perform or cause performance of a second (e.g., different) automated action (e.g., generate a map (including a path and structures) based on aisle 9 and provide the map).

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process for crowd and traffic control and for mapping a geographical area. The machine learning system enables recognition and/or identification of tens, hundreds, thousands, or millions of features and/or feature values for tens, hundreds, thousands, or millions of observations, thereby increasing accuracy and consistency and reducing delay associated with utilizing machine learning and network of trust for crowd and traffic control and for mapping a geographical area relative to requiring computing resources to be allocated for tens, hundreds, or thousands of operators to manually perform crowd and traffic control and perform mapping a geographical area using the features or feature values.

As indicated above, FIG. 2 is provided as an example. Other examples may differ from what is described in connection with FIG. 2.

Figure 3:
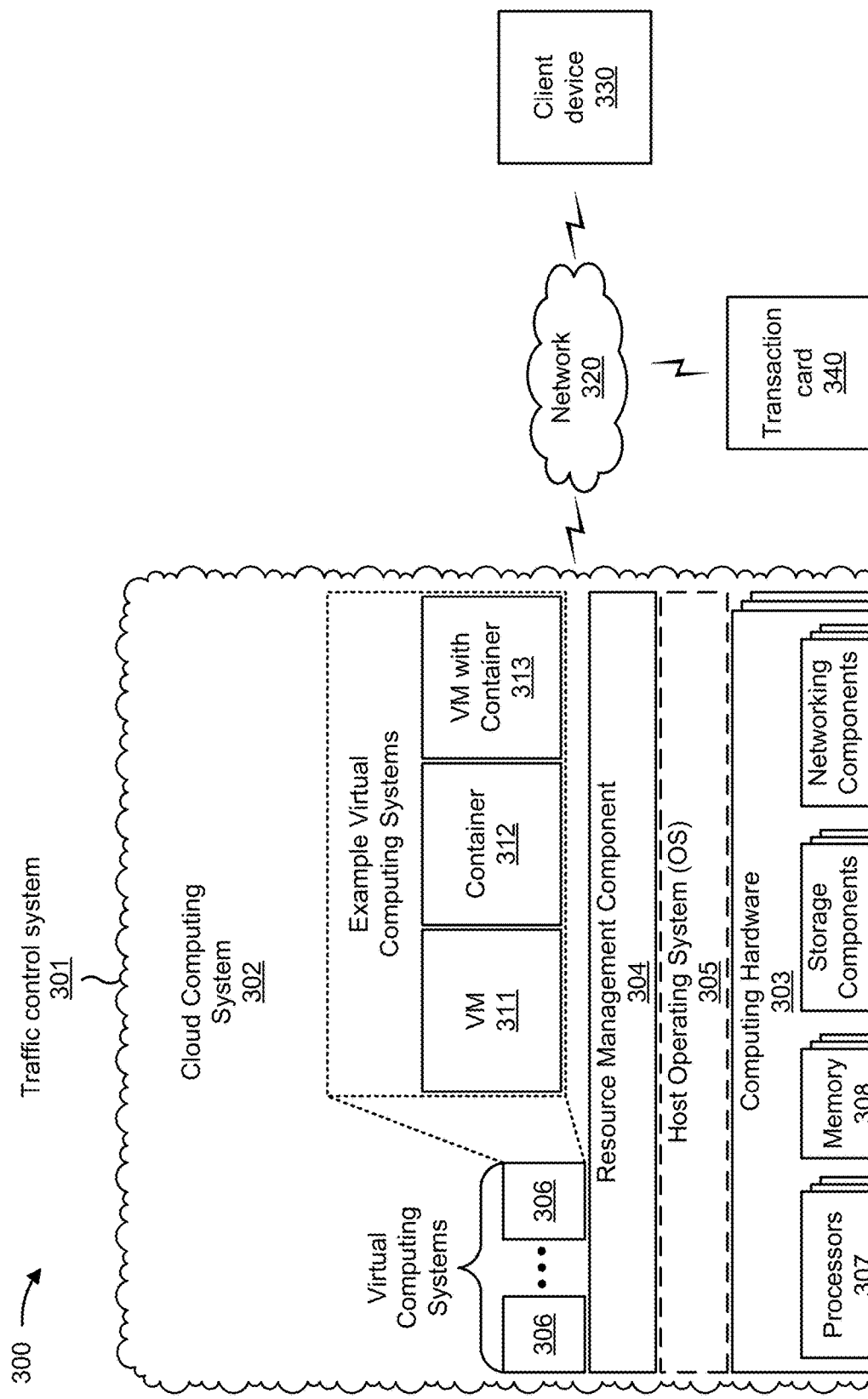
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a traffic control system 301, which may include one or more elements of and/or may execute within a cloud computing system 302. The cloud computing system 302 may include one or more elements 303-313, as described in more detail below. As further shown in FIG. 3, environment 300 may include a network 320, a client device 330, and/or a transaction card 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the traffic control system 301 may include one or more elements 303-313 of the cloud computing system 302, may execute within the cloud computing system 302, and/or may be hosted within the cloud computing system 302, in some implementations, the traffic control system 301 may not be cloud-based (e.g., may be implemented outside of a cloud computing system) or may be partially cloud-based. For example, the traffic control system 301 may include one or more devices that are not part of the cloud computing system 302, such as device 400 of FIG. 4, which may include a standalone server or another type of computing device.

The traffic control system 301 may perform one or more operations and/or processes described in more detail elsewhere herein. For example, traffic control system 301 includes one or more devices that utilize machine learning and network of trust for crowd and traffic control and for mapping a geographical area. In some implementations, traffic control system 301 receives information from and/or transmits information to one or more client devices 330.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Client device 330 includes one or more devices capable of receiving, generating, storing, processing, and/or providing information, such as information described herein. For example, client device 330 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 330 receives information from and/or transmit information to traffic control system 301.

Transaction card 340 includes a transaction card that can be used to complete a transaction. For example, transaction card 340 may include a credit card, a debit card, a gift card, a payment card, an automated teller machine (ATM) card, a stored-value card, a fleet card, a room or building access card, a driver's license card, and/or the like. Transaction card 340 may be capable of storing and/or communicating data for a POS transaction with a transaction terminal. For example, transaction card 340 may store and/or communicate data, including account information (e.g., an account identifier, a cardholder identifier, etc.), expiration information of transaction card 340 (e.g., information identifying an expiration month and/or year of transaction card 340), banking information (e.g., a routing number of a bank, a bank identifier, etc.), transaction information (e.g., a payment token), and/or the like. For example, to store and/or communicate the data, transaction card 340 may include a magnetic strip and/or an integrated circuit (IC) chip.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
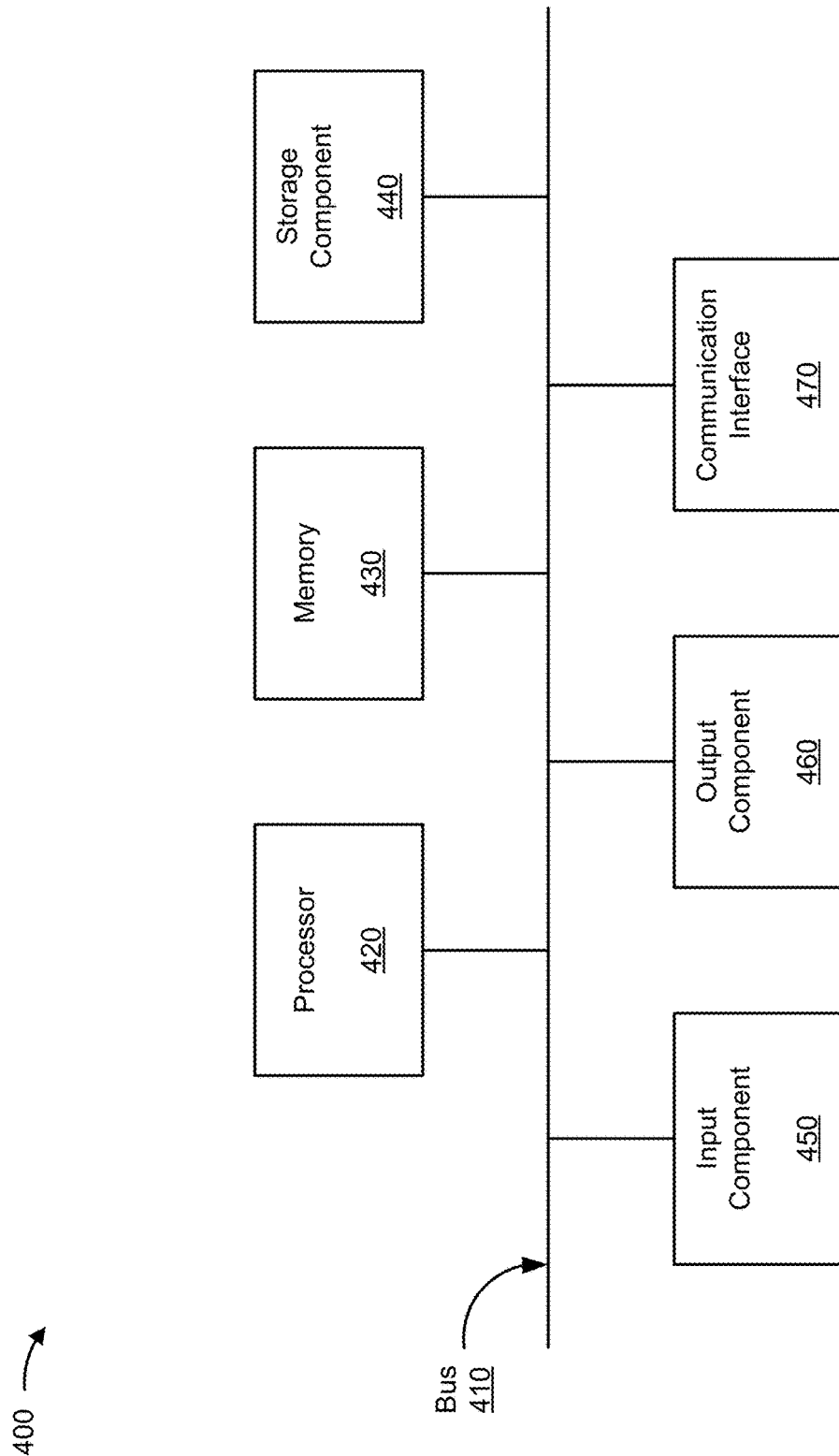
FIG. 4 is a diagram of example components of one or more devices of FIG. 3.

FIG. 4 is a diagram of example components of a device 400, which may correspond to traffic control system 301, client device 330, and/or transaction card 340. In some implementations, traffic control system 301, client device 330, and/or transaction card 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 for utilizing machine learning and network of trust for crowd and traffic control and for mapping a geographical area. In some implementations, one or more process blocks of FIG. 5 may be performed by a traffic control system (e.g., traffic control system 301). In some implementations, one or more process blocks of FIG. 5 may be performed by another device or a group of devices separate from or including the traffic control system, such as client device (e.g., client device 330), transaction card (e.g., transaction card 340), and/or the like. Additionally, or alternatively, one or more process blocks of FIG. 5 may be performed by one or more components of a device 400, such as processor 420, memory 430, storage component 440, input component 450, output component 460, communication component 470, and/or the like.

As shown in FIG. 5, process 500 may include receiving application data associated with transaction applications of client devices and transaction card data associated with transaction cards (block 510). For example, the traffic control system may receive application data associated with transaction applications of client devices and transaction card data associated with transaction cards, as described above.

As further shown in FIG. 5, process 500 may include receiving geographical data identifying a geographical area associated with users of the client devices and the transaction cards (block 520). For example, the traffic control system may receive geographical data identifying a geographical area associated with users of the client devices and the transaction cards, as described above.

As further shown in FIG. 5, process 500 may include determining, based on the application data, the transaction card data, and the geographical data, location data identifying geographical locations of the users in the geographical area (block 530). For example, the traffic control system may determine, based on the application data, the transaction card data, and the geographical data, location data identifying geographical locations of the users in the geographical area, as described above.

As further shown in FIG. 5, process 500 may include determining, based on the location data, quantity data identifying quantities of the users located on multiple paths of the geographical area (block 540). For example, the traffic control system may determine, based on the location data, quantity data identifying quantities of the users located on multiple paths of the geographical area, as described above.

As further shown in FIG. 5, process 500 may include processing the geographical data, the location data, and the quantity data, with a machine learning model to identify a path with less than a threshold quantity of users in the geographical area (block 550). For example, the traffic control system may process the geographical data, the location data, and the quantity data, with a machine learning model to identify the path with less than the threshold quantity of users in the geographical area, as described above.

As further shown in FIG. 5, process 500 may include performing one or more actions based on the path (block 560). For example, the traffic control system may perform one or more actions based on the path, as described above.

Process 500 may include additional implementations, such as any single implementation or any combination of implementations described below and/or in connection with one or more other processes described elsewhere herein.

In a first implementation, performing the one or more actions comprises one or more of: providing data identifying the path to one of the client devices; generating directions based on the path and providing the directions to one of the client devices; or generating a map based on the path and providing the map to one of the client devices.

In a second implementation, alone or in combination with the first implementation, performing the one or more actions comprises: providing data identifying the path to a device associated with an operator of a venue associated with the geographical area; providing data identifying the path to a device associated with a provider of a navigation application; or retraining the machine learning model based on the path.

In a third implementation, alone or in combination with one or more of the first and second implementations, process 500 includes processing the location data and the geographical data, with another machine learning model, to determine movement patterns of the users in the geographical area, paths through the geographical area, and structures in the geographical area; generating a map of the geographical area based on the movement patterns of the users in the geographical area, the paths through the geographical area, and the structures in the geographical area; and performing one or more additional actions based on the map.

In a fourth implementation, alone or in combination with one or more of the first through third implementations, the geographical area includes a building and the map includes a map of an interior of the building.

In a fifth implementation, alone or in combination with one or more of the first through fourth implementations, performing the one or more additional actions comprises one or more of: providing the map to one of the client devices; generating directions based on the map and providing the directions to one of the client devices; or providing the map to a device associated with an operator of a venue associated with the geographical area.

In a sixth implementation, alone or in combination with one or more of the first through fifth implementations, performing the one or more additional actions comprises one or more of: providing the map to a device associated with a provider of a navigation application; or retraining the other machine learning mode based on the map.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, application data associated with transaction applications of client devices and transaction card data associated with transaction cards;
   receiving, by the device, geographical data identifying a geographical area associated with users of the client devices and the transaction cards;
   determining, by the device and based on the application data, the transaction card data, and the geographical data, location data identifying geographical locations of the users in the geographical area,
      wherein determining the location data comprises:
         determining geographical boundaries of multiple paths of the geographical area based on the geographical locations of the users;
   determining, by the device and based on the location data, quantity data identifying quantities of the users located on the multiple paths;

training, by the device and using a neural network algorithm, a machine learning model based on historical location data, historical data identifying historical path requests, and historical data identifying historical paths to identify a set of the historical paths with historical flows of historical users that facilitate exiting historical geographical areas;

processing, by the device, the geographical data, the location data, and the quantity data, with the machine learning model to identify a path, of the multiple paths, associated with a flow of users that facilitates exiting the geographical area, wherein processing the geographical data, the location data, and the quantity data, with the machine learning model, to identify the path comprises:

determining a multitude of structures in the geographical area based on movement patterns of the users in the geographical area, determining distances between two or more structures, of the multitude of structures and dimensions of the multitude of structures, and identifying the path based on determining the distances between the two or more structures and the dimensions of the multitude of structures;

retraining, by the device, the machine learning model based on the identified path to improve an accuracy and an efficiency of the machine learning model;

identifying, by the machine learning model and after the retraining, one or more additional paths with less than a threshold quantity of users in one or more geographical areas associated with flows of users that facilitate exiting the geographical area; and performing, by the device, one or more actions based on the one or more additional identified paths.

2. The method of claim 1, wherein performing the one or more actions comprises one or more of:
providing data identifying the one or more additional identified paths to one of the client devices;
generating directions based on the one or more additional identified paths and providing the directions to one of the client devices; or
generating a map based on the one or more additional identified paths and providing the map to one of the client devices.

3. The method of claim 1, wherein performing the one or more actions comprises:
providing data identifying the one or more additional identified paths to a device associated with an operator of a venue associated with the geographical area; or
providing data identifying the one or more additional identified paths to a device associated with a provider of a navigation application.

4. The method of claim 1, further comprising:
processing the location data and the geographical data, with another the machine learning model, to determine movement patterns of the users in the geographical area, paths through the geographical area, and structures in the geographical area;
generating a map of the geographical area based on the movement patterns of the users in the geographical area, the paths through the geographical area, and the structures in the geographical area; and
performing one or more additional actions based on the map.

5. The method of claim 4, wherein the geographical area includes a building and the map includes a map of an interior of the building.

6. The method of claim 4, wherein performing the one or more additional actions comprises one or more of:
providing the map to one of the client devices;
generating directions based on the map and providing the directions to one of the client devices; or
providing the map to a device associated with an operator of a venue associated with the geographical area.

7. The method of claim 4, wherein performing the one or more additional actions comprises one or more of:
providing the map to a device associated with a provider of a navigation application; or
retraining the machine learning model based on the map.

8. A non-transitory computer-readable medium storing instructions, the instructions comprising:
one or more instructions that, when executed by one or more processors, cause the one or more processors to:
receive application data associated with transaction applications of client devices and transaction card data associated with transaction cards;
receive geographical data identifying a geographical area associated with users of the client devices and the transaction cards,
wherein the geographical area includes one or more of:
an amusement park,
an arena,
a stadium,
a parking lot,
a shopping mall, or
a store;
determine, based on the application data, the transaction card data, and the geographical data, location data identifying geographical locations of the users in the geographical area,
wherein the one or more instructions, that cause the one or more processors to determine the location data, cause the one or more processors to determine geographical boundaries of multiple paths of the geographical area based on the geographical locations of the users;
determine, based on the location data, quantity data identifying quantities of the users located on the multiple paths of the geographical area;
train, using a neural network algorithm, a machine learning model based on historical location data, historical data identifying historical path requests, and historical data identifying historical paths to identify a set of the historical paths with historical flows of historical users that facilitate exiting historical geographical areas;
process the geographical data, the location data, and the quantity data, with the machine learning model to identify a path, of the multiple paths, associated with a flow of users that facilitates exiting the geographical area with less than a threshold quantity of users in the geographical area,
wherein the one or more instructions, that cause the one or more processors to process the geographical data, the location data, and the quantity data, with the machine learning model, to identify the path, cause the one or more processors to:
determine a multitude of structures in the geographical area based on movement patterns of the users in the geographical area,
determine distances between two or more structures, of the multitude of structures, and dimensions of the multitude of structures, and identify the path based on determining the distances between the two or more structures and the dimensions of the multitude of structures;
retrain the machine learning model based on the identified path to improve an accuracy and an efficiency of the machine learning model;
identify, by the machine learning model and after the retraining, one or more additional paths with less than the threshold quantity of users in one or more geographical areas associated with flows of users that facilitate exiting the geographical area; and
perform one or more actions based on the one or more additional identified paths.

9. The non-transitory computer-readable medium of claim 8, wherein the one or more instructions, that cause the one or more processors to perform the one or more actions, cause the one or more processors to one or more of:
provide data identifying the one or more additional identified paths to one of the client devices;
generate directions based on the one or more additional identified paths and provide the directions to one of the client devices;
generate a map based on the one or more additional identified paths and provide the map to one of the client devices;
provide data identifying the one or more additional identified paths to a device associated with an operator of a venue associated with the geographical area; or
provide data identifying the one or more additional identified paths to a device associated with a provider of a navigation application.

10. The non-transitory computer-readable medium of claim 8, wherein the one or more instructions, when executed by the one or more processors, further cause the one or more processors to:
process the location data and the geographical data, with the machine learning model, to determine movement patterns of the users in the geographical area, paths through the geographical area, and structures in the geographical area;
generate a map of the geographical area based on the movement patterns of the users in the geographical area, the paths through the geographical area, and the structures in the geographical area; and
perform one or more additional actions based on the map.

11. The non-transitory computer-readable medium of claim 10, wherein the one or more instructions, that cause the one or more processors to perform the one or more additional actions, cause the one or more processors to one or more of:
provide the map to one of the client devices;
generate directions based on the map and provide the directions to one of the client devices;
provide the map to a device associated with an operator of a venue associated with the geographical area;
provide the map to a device associated with a provider of a navigation application; or
retrain the machine learning model based on the map.

12. The non-transitory computer-readable medium of claim 8, wherein the one or more instructions, when executed by the one or more processors, further cause the one or more processors to:
receive, from one of the client devices, a request for directions to exit the geographical area;
calculate, based on the request, directions from a location of the one of the client devices to an exit of the geographical area via the one or more additional identified paths; and
provide the directions to the one of the client devices.

13. The non-transitory computer-readable medium of claim 8, wherein the one or more instructions, when executed by the one or more processors, further cause the one or more processors to:
process the location data and the geographical data, with another the machine learning model, to determine movement patterns of the users in the geographical area;
determine paths through the geographical area based on the movement patterns of the users in the geographical area;
determine structures in the geographical area based on the movement patterns of the users in the geographical area;
generate a map of the geographical area based on the movement patterns of the users in the geographical area, the paths through the geographical area, and the structures in the geographical area; and
provide the map to a device associated with an operator of a venue associated with the geographical area.

14. A device, comprising:
one or more memories; and
one or more processors, coupled to the one or more memories, configured to:
receive application data associated with transaction applications of client devices and transaction card data associated with transaction cards;
receive geographical data identifying a geographical area associated with users of the client devices and the transaction cards;
determine, based on the application data, the transaction card data, and the geographical data, location data identifying geographical locations of the users in the geographical area,
wherein the one or more processors, to determine the location data, are configured to determine geographical boundaries of multiple paths of the geographical area based on the geographical locations of the users;
determine, based on the location data, quantity data identifying quantities of the users located on the multiple paths;
train, using a neural network algorithm, a machine learning model based on historical location data, historical data identifying historical path requests, and historical data identifying historical paths to identify a set of the historical paths with historical flows of historical users that facilitate exiting historical geographical areas;
process the geographical data, the location data, and the quantity data, with the machine learning model to identify a path, of the multiple paths, associated with a flow of users that facilitates exiting the geographical area,
wherein the one or more processors, to process the geographical data, the location data, and the quantity data, with the machine learning model, to identify the path, are configured to:
determine a multitude of structures in the geographical area based on movement patterns of the users in the geographical area,
determine distances between two or more structures, of the multitude of structures, and dimensions of the multitude of structures, and identify the path based on determining the distances between the two or more of structures and the dimensions of the two or more structures;

retrain the machine learning model based on the identified path to improve an accuracy and an efficiency of the machine learning model;

identify, by the machine learning model and after the retraining, one or more additional paths with less than a threshold quantity of users in one or more geographical areas associated with flows of users that facilitate exiting the geographical area; and perform one or more actions based on the one or more additional identified paths.

15. The device of claim 14, wherein the one or more processors, to perform the one or more actions, are configured to:

provide data identifying the one or more additional identified paths to one of the client devices;

generate directions based on the one or more additional identified paths and provide the directions to one of the client devices; or generate a map based on the one or more additional identified paths and provide the map to one of the client devices.

16. The device of claim 14, wherein the one or more processors, to perform the one or more actions, are configured to:

provide data identifying the one or more additional identified paths to a device associated with an operator of a venue associated with the geographical area; or provide data identifying the one or more additional identified paths to a device associated with a provider of a navigation application.

17. The device of claim 14, wherein the one or more processors are further configured to:

process the location data and the geographical data, with another the machine learning model, to determine movement patterns of the users in the geographical area, paths through the geographical area, and structures in the geographical area;

generate a map of the geographical area based on the movement patterns of the users in the geographical area, the paths through the geographical area, and the structures in the geographical area; and perform one or more additional actions based on the map.

18. The device of claim 17, wherein the geographical area includes a building and the map includes a map of an interior of the building.

19. The device of claim 17, wherein the one or more processors, to perform the one or more additional actions, are configured to:

provide the map to one of the client devices;

generate directions based on the map and provide the directions to one of the client devices; or provide the map to a device associated with an operator of a venue associated with the geographical area.

20. The device of claim 17, wherein the one or more processors, to perform the one or more additional actions, are configured to:

provide the map to a device associated with a provider of a navigation application; or retrain the machine learning model based on the map.

* * * * *